United States Patent Office 3,280,124
Patented Oct. 18, 1966

3,280,124
PROCESS FOR THE PREPARATION OF 2,4,6-TRIFLUOROPYRIMIDINE
Max M. Boudakian and Ehrenfried H. Kober, Hamden, and Eugene R. Shipkowski, Wallingford, Conn., assignors to Olin Mathieson Chemical Corporation, New Haven, Conn., a corporation of Virginia
No Drawing. Filed Sept. 22, 1965, Ser. No. 489,391
2 Claims. (Cl. 260—251)

This application relates to a process for the preparation of 2,4,6-trifluoropyrimidine.

The preparation of fluorinated pyrimidines from the corresponding chlorinated pyrimidines has been heretofore only accomplished with difficulty. For example, E. Kober et al. in J. Am. Chem. Soc., 81, 3769 (1959) have reported that antimony tri- or pentafluoride (Swarts reagent) is not effective in replacing a chlorine atom attached directly to a pyrimidine ring with a fluorine atom.

It has been found that the preparation of 2,4,6-trifluoropyrimidine is a particularly difficult procedure. For example, C. W. Tullock et al. in J. Am. Chem. Soc., 82, 5107 (1960) reported that when an attempt was made to fluorinate 2,4,6-trichloropyrimidine by means of sulfur tetrafluoride at 225° C., only mixtures of partly fluorinated pyrimidines were obtained. H. Schroeder et al. in J. Org. Chem. 27, 2580 (1962), have disclosed the preparation of this derivative wherein 2,4,6-trichloropyrimidine was subjected to three successive fluorination-distillation operations with fresh silver fluoride (AgF). However, there are serious disadvantages associated with this process. A large molar excess of silver fluoride is required in the process (11 moles of AgF to 1.0 mole of 2,4,6-trichloropyrimidine), and in view of the cost of the silver salt the use of this excess is prohibitively expensive. Furthermore, the requirement for a multi-step reflux and distillation operation is tedious and expensive.

2,4,6-trifluoropyrimidine is a useful nematocide having demonstrated utility against the root knot nematode, a plant parasite which is particularly damaging to several vegetable crops. The fluorinated pyrimidine is also a useful intermediate in the preparation of other chemical derivatives. For example, I. Wempen et al. in J. Med. Chem., 6, 688 (1963) has prepared 6-fluorocytosine from the fluorinated pyrimidine. This substituted cytosine has been found to exert growth inhibitory activity against the fungi *Candida albicans* and *Saccharomyces carlbergensis*.

The principal object of this invention is to provide an economically attractive process for the preparation of 2,4,6-trifluoropyrimidine which is not characterized by the foregoing deficiencies. Another object is to provide a direct solvent-free process for the conversion of 2,4,6-trichloropyrimidine to 2,4,6-trifluoropyrimidine in high yield and purity.

These objects have been accomplished in accordance with this invention. It has now been found that 2,4,6-trichloropyrimidine reacts with anhydrous potassium fluoride at a selected elevated temperature range to provide 2,4,6-trifluoropyrimidine in high yield and excellent purity. Under the selected conditions, no diluent or solvent need be employed in the fluorination process, and consequently recovery of or disposal of such materials is obviated. Furthermore, the process described herein provides high yields of 2,4,6-trifluoropyrimidine in a short period, and this represents a significant improvement over the lengthy reaction periods previously required for the preparation of this derivative in high yield. No catalyst is required in the process described herein in order to provide high yields of 2,4,6-trifluoropyrimidine.

To provide 2,4,6-trifluoropyrimidine in accordance with the process disclosed herein, the fluorination must be performed in a sealed reaction vessel (i.e., autoclave) at a temperature range of about 230° C. to about 400° C. However, at the lower end of this range, reaction is slower and yield of desired product is reduced. Some degradation and/or intermolecular condensation occurs at the higher end of the range, and consequently a preferred temperature range of 275°–350° C. is advantageously utilized.

When the fluorination is complete, the product may be readily isolated by several techniques. For instance, the reaction mixture may be distilled directly from the reaction vessel leaving residual inorganic salts in the vessel. Alternatively, the reaction mixture may be extracted with appropriate organic solvents such as ether, benzene, xylene, etc., and the resulting organic solution may be fractionally distilled to provide the 2,4,6-trifluoropyrimidine in high purity.

The follow example will serve to illustrate the preparation of 2,4,6-trifluoropyrimidine in accordance with the process described herein.

Example 1

Anhydrous potassium fluoride (32.0 gms.; 0.55 mole) and 2,4,6-trichloropyrimidine (25.0 gms.; 0.136 mole) were mixed together. The mixture was placed in a 300 ml. micro-Monel autoclave, and the sealed autoclave was heated at 300°–310° C. for a period of two hours during which period a maximum pressure of 332 p.s.i.g. was observed.

The cooled autoclave was opened and 52.0 gms. of a wet black solid was removed. The organic products were separated from the solids by distillation at reduced pressure (100–25 mm.). A clear colorless liquid (14.6 gms.), B.P. 40°–50° C., $n_D^{25}$ 1.4110, was obtained. Vapor phase chromatographic analysis revealed that the liquid was a mixture: 2,4,6-trifluoropyrimidine (90.0 percent), chlorodifluoropyrimidine (9.1 percent) and dichlorofluoropyrimidine (0.90 percent). This mixture corresponded to a 72% analytical yield of 2,4,6-trifluoropyrimidine, 6.3% yield of chlorodifluoropyrimidine and 0.4% yield of dichlorofluoropyrimidine. Analysis of the salt cake residue indicated 0.347 mole of chlorine had been displaced (equivalent to 85 percent of chlorine available in trichloropyrimidine) and 0.334 mole of fluorine had been consumed. The liquid mixture was then fractionally distilled to provide a clear colorless liquid, B.P. 59°–60° C./180 mm., which was revealed by vapor phase chromatographic analysis to be 2,4,6-trifluoropyrimidine in over 99% purity.

What is claimed is:
1. A process for preparing 2,4,6-trifluoropyrimidine which comprises reacting 2,4,6-trichloropyrimidine with anhydrous potassium fluoride at a temperature range of about 230°–400° C.
2. The process of claim 1 wherein a reaction temperature range of 275°–350° C. is employed.

No references cited.

NICHOLAS S. RIZZO, *Primary Examiner.*